Feb. 7, 1939.　　　　G. M. DEMING　　　　2,146,332
CONNECTION IN METALLIC STRUCTURES
Original Filed March 27, 1935
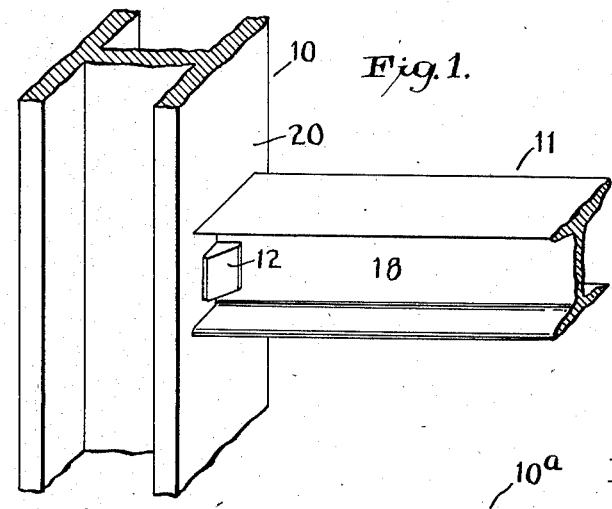
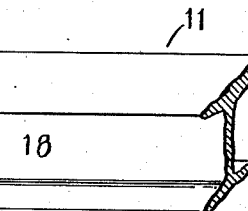
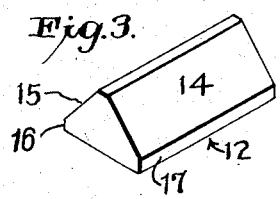
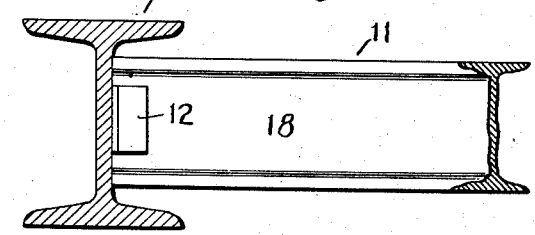
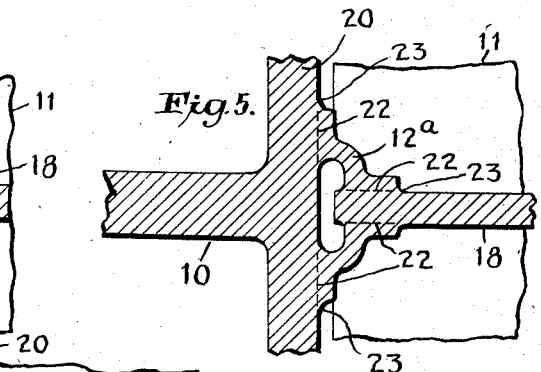
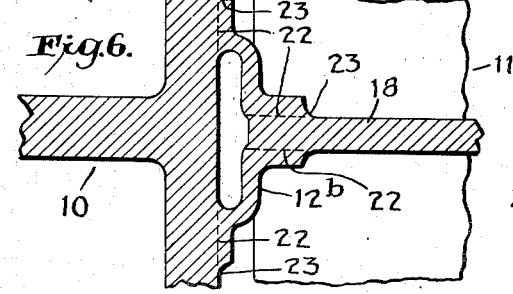

Patented Feb. 7, 1939

2,146,332

UNITED STATES PATENT OFFICE 2,146,332

CONNECTION IN METALLIC STRUCTURES

George M. Deming, East Orange, N. J., assignor to Air Reduction Company, Incorporated, New York, N. Y., a corporation of New York Application March 27, 1935, Serial No. 13,265
Renewed October 25, 1938

1 Claim. (Cl. 189—36)

This invention relates to structures of the type of metallic building structures, the members of which are rolled shapes such as channels, I-beams and the like. The object of the invention is to provide a fusion bonded connection between the structural members having important advantages over both riveted connections and the kinds of welded connections heretofore proposed. The joint herein described is one that can be made quickly and economically, possesses great strength, and is compatible with a hinging that permits the beams to flex naturally with the load.

The principal problem involved in structural steel construction is that of attaching a beam to a column, or to another beam in angular relationship to the latter. A very common form of connection consists of angle plates which are riveted to the members. The desirability of substituting welding for riveting has long presented itself, and one known form of welded joint employs bars placed at opposite sides of the web of a beam, with their ends abutting the flange of a column, or the flange or web of another beam. In such a joint the welds were external fillet welds, made with added metal, between edges of the bars and the web of the beam to be attached, and between the outer faces of the bars and the surfaces of the supporting member. With that construction, much of the advantage of the welded type of joint is offset because of the increased rigidity of the joint as compared with the usual riveted type, which though tightly riveted, accommodates itself to a hinging action which keeps the joint from being unduly subjected to other than normal stresses, that is, to other than vertically disposed shearing stresses. In another type of marginally welded joint, excessive rigidity is avoided through the use of angle plates, the legs of which contiguous with the column are long enough to permit some flexing in this region as a result of any deflection of the beam. Thereby tensile stresses at the upper ends of the linear welds at the outer edges of the aforesaid legs are reduced, but at the disadvantage of displacing these welds remotely from the projected center line of the web of the beam, for which reason bolting, additional to the welds, is sometimes resorted to in a mistaken effort to get the connection nearer the center.

In accordance with this invention, filler blocks having faces, the planes of which are in angular relation to each other, are interfacially fusion bonded to large areas of the beam and of the column, or of another beam. From the nature of this joining the effects are quite different from those resulting from the narrow marginal welds of prior welded structural joints. The shape of the filler blocks themselves may be varied from a form in which the welds to the surface of the column are very close to the center line of the beam, to other forms in which the broad interfacial bondings are removed to any suitable distance from said line in order that a suitable degree of flexibility may be introduced into the joining pieces. In any of these cases the welds can readily and economically be made very wide as compared with their vertical lengths, and as a result of this the tensile stresses imposed upon the welds may be reduced threefold. First of all, for any given angular deflection of the beam, the tensile stresses are less proportionately as the length of the weld is less; secondly, the unit stresses for any given tensile force exerted at an extreme end of a weld decrease in inverse proportion to the cross-sectional area of the weld at that point, that is to say, they decrease in inverse proportion to the width of the weld; third, if the weld is relatively short, any given angular deflection of the beam can more readily be accommodated in local deformation of the web of the beam, or of the other member in case the attachment is to a relatively thin portion of some other structural member. If, however, it is desired to provide some flexibility in the joining block, that may be done, and the advantages just mentioned can in general be retained. Furthermore, it is a part of this invention that notch effect is largely or entirely eliminated by the presence of approximate fillets formed of excess metal expressed at the edges from the surface fused material which unites and congeals to make the interfacial weld.

In the accompanying drawing, forming part hereof:

Fig. 1 is a fragmentary perspective view showing a beam connected to a column in accordance with the invention;

Fig. 2 shows a similar joint between the end of a beam and the web of a larger beam, the larger beam being in cross-section and a portion of the smaller beam in elevation;

Fig. 3 is a perspective view of a joining piece for use in making joints such as illustrated in Figs. 1 and 2;

Fig. 4 is a horizontal section through a joint between a beam and a column made with filler blocks or joining pieces like the one shown in Fig. 3; and Figs. 5 and 6 are similar sections through joints in which modified forms of joining pieces are used, these forms being designed for different degrees of flexibility in the joining pieces.

In Figs. 1 and 4-6 two structural members united by joints embodying the invention are represented by an H-column 10 and an I-beam 11. In Fig. 2 the end of a beam 11 is connected to the web of another beam 10ª.

One form of the filler or joining block that may be employed is illustrated in Figs. 1-4 and is designated 12, and other forms 12ª and 12ᵇ are shown in Figs. 5 and 6.

The block 12, shown separately in Fig. 3, is a piece of more or less triangular section with its corners slabbed off so that there are no feather edges along the sides of the forming faces. The two faces 14 and 15 in planes at right angles to each other are the joining faces. A method of making the structural joint is fully disclosed in my copending application Serial No. 452,899, filed May 16, 1930, (Patent No. 2,053,216, dated Sept. 1, 1936) of which this application is a continuation in part. The metal over the surfaces 14, 15 is quickly heated to fusion by the application of numerous flames of sufficient temperature, preferably of a mixture containing oxygen and acetylene. The block 12 is slabbed off at 16 and 17 so that there are no edges along the surfaces 14, 15 thin enough to melt away before the entire surfaces 14 and 15 are heated to a welding condition. While the faces of the block 12 are being heated similar areas of the web 18 of the beam 11 and the face 20 of the column 10 are melted or heated, the parts at this time being in proximity. Thereupon, and while the surfaces remain molten, the flame heat is removed and the filler block is thrust into the dihedral angle with sufficient force to overcome any irregularities and insure that the fluid areas coalesce.

The formed joint is illustrated in section in Figs. 4-6 showing different forms of the filler block. The interfacial welds between the surfaces 14, 15 and the similar areas of the structural members are represented by the dash lines 22, showing the construction to be integral. The strength is increased by marginal formations 23 having the effect of fillets, these being produced by melting enough metal so that there is an excess to be squeezed out beyond the edges of the filler block when the latter is thrust home against both surfaces of the included angle of the structural members to be united.

The breadth of the interfacial welds is consistent with a relatively short vertical length. Since tensile stresses are greatest at the ends of the welds, more especially those between the filler block and the column, or other member at the end of the span of the beam 11, it will be understood that the width of the weld need not be uniform and that the filler blocks may be shaped so that their joining faces are widest at regions where width of weld is of the greatest importance.

The joint of Fig. 4, rigid in the joining piece, can have flexibility in the web of the beam 11, and also in the web of a beam 10ª (Fig. 2); the shorter vertically the joining block, the greater the opportunity for this slight useful distortion of the elements of one or both of the structural members.

Figs. 5 and 6 illustrate joints made with filler blocks which, in addition to having the general characteristics of the blocks already described, are designed, respectively, to allow of a slight amount and a greater amount of flexibility within in the joining piece. These filler blocks have limbs spaced apart and having broad terminals carrying the joining faces which are united by the interfacial welds 22 to the structural members. It will be observed that there is an absence of all notch effect, regardless of the exact length of the beam. For any given condition in a part of a structure, an appropriate joint can be made by using the suitable filler block, the welds being closer to or farther from the central plane of the web of the beam 11 as desired.

In carrying out the invention the interfacial bonds may be made of fused alloy metal of lower melting point than the metal of the structural members themselves. For example, the joining surfaces of the filler block may be covered with a brazing alloy or composition, in which case the areas of the structural members need not be actually melted, the result being in the nature of a brazed joint rather than a joint of structure truly homogeneous with the metal on each side of the bond.

I claim:

In a metallic building structure, a connection between two angularly related structural members including an angular filler block having broad areas integrally bonded to corresponding areas of said building members, said filler block having steep angular faces along the edge of said broad areas so that the block has no feather edge along said areas, the interfacial bonds consisting of fused and congealed metal of original surfaces of the members and the block, and extruded fillets of the same metal formed by adherence of the molten metal to the surfaces of the structural members and the steep angular faces along the edges of the block bonding areas.

GEORGE M. DEMING.